Figure 1:
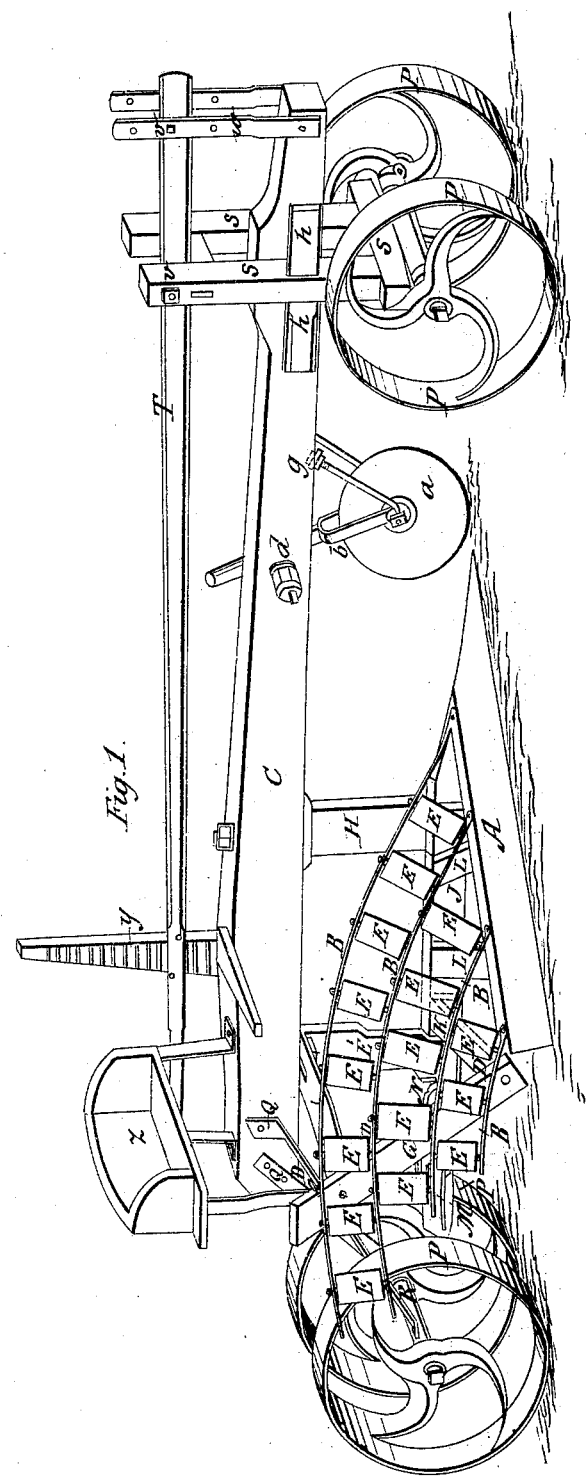

W. W. SKINNER.
Revolving Moldboard.

No. 18,776.

2 Sheets—Sheet 1.

Patented Dec. 1, 1857.

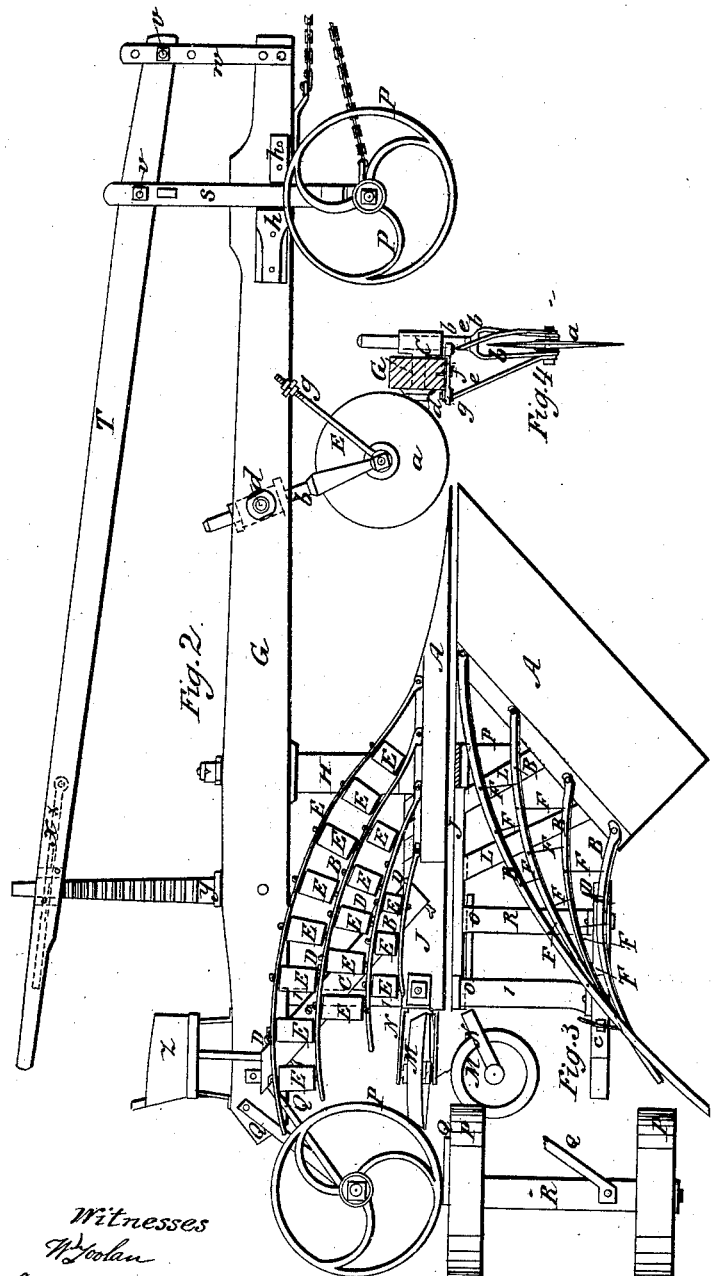

UNITED STATES PATENT OFFICE.

WILLIAM W. SKINNER, OF DAVENPORT, IOWA.

IMPROVEMENT IN PLOWS.

Specification forming part of Letters Patent No. 18,776, dated December 1, 1857.

*To all whom it may concern:*

Be it known that I, WILLIAM W. SKINNER, of the city of Davenport, county of Scott, and State of Iowa, have invented a new and useful Improvement on a Prairie Sod-Plow; and I do hereby declare that the following is a full, clear, and exact description of the construction and operation of the same, reference being had to the annexed drawings, making a part of this specification, and to the letters of reference marked thereon, in which—

Figure 1 is a perspective elevation; Fig. 2, elevation; Fig. 3, a plan, and Fig. 4 a detail of revolving cutter.

The plowshare (marked A) is in the usual form of a lap-share prairie-plow, with four flat wrought-iron rods (marked B) attached to the share A by screw-bolts. The said rods at the upper end are fastened to a wooden bar (marked C in the drawings) by four wrought-iron slide-rods, (marked D.) The design of the slide-rods D is to alter the angle of the mold-board.

Between the iron rods B are three rows of rollers, wood or iron, (marked E,) which revolve on wrought-iron spindles, (marked F.) The plowshare A is connected with the beam marked G by a substantial wrought-iron standard, (marked H,) secured at the lower end by screw-bolts to the landside, and at the upper by passing through the center of the cross-section of beam G, having a screw-nut at the upper point of the standard H. The landside, share, and mold-board are further secured to the beam G by a wrought-iron brace, (marked I in the drawings,) which is fastened to landside by screw-bolts, then runs up to under side of beam G, and secured by a screw-bolt. It then bends at right angles and runs to the wooden bar C, to which it is attached by a screw-bolt.

In the wrought-iron brace I, on the under side of beam G, there is a long slot, the object of which is to throw the plowshare to or from the land. The lower end of wooden bar C is attached to the landside (marked J) by a wrought-iron bar (marked K) and screw-bolts. The plowshare A and the landside J are further connected by two wrought-iron bars, (marked L,) being the braces, as in ordinary plows.

At the back end of the landside there is a cast-iron friction-wheel, (marked M,) which runs on a pivot in a crotch marked N, which is attached to the landside by screw-bolts marked O. This friction-wheel is placed upon a bevel depressed on the outer surface, and the face of the wheel is parallel to the cut of the sod. This wheel stands slightly in advance of the landside.

The whole plow runs upon the four cast-iron wheels, (marked P.) The two hand-wheels are fixed permanently to the beam G by two wrought-iron bars, (marked Q,) running from the beam to the axle, (marked R.) The hind wheels are wide enough to run in the furrow.

The front wheels, P, instead of being fixed permanently to the wooden standards marked S, as is usual in prairie-plows, are attached by a king-bolt, and act like the fore wheels of a wagon. The standards S, being supported on the beam G by two wooden blocks, (marked h,) keep them in position. When the lever T is depressed the front wheels can be turned at right angles under the beam G and the plow turned within its own length. The lever T works on a fulcrum marked U, which passes through the upper ends of standards S; and at the point marked U in the drawings the lever is fixed to the beam G by two permanent iron standards, (marked W,) which are secured to beam G by two screw-bolts running through beam. The lift of the plow is regulated by the poles at the upper end of standard W. The lever is kept in position by the spring X and standard or radiating bar marked Y, which is secured to beam G by one screw-bolt.

The driver's seat (marked Z) is set upon iron standards fixed at one end to the beam G.

The cast-steel revolving cutter (marked a) is attached to the beam G by a round shank of wrought-iron, (marked b,) which slides in a wrought-iron circular clasp-collar, (marked c,) the shank from which passes through beam G, and is secured on the opposite side by a screw-nut marked d. The revolving cutter is further supported and regulated by the wrought-iron rods marked e, running from the axle through a wrought-iron plate marked f, which is fastened to the under side of beam G by screw-bolts. The rods e, at the point where they run through plate f, are secured to said plate by chuck-nuts, by the regulation of which the rolling cutter can be secured at any depth or angle.

I do not claim the rolling cutter, the use of the front wheels, the lever, beam, and plow-share, the rod, mold-board, or any of the described parts, except as shown and set forth in the claim.

What I claim as my invention, and desire to secure by Letters Patent, is—

The mold-board B E B E B E, friction-roller M, rotary cutter $a$, wheels $b$, adjusting-lever T, and seat Z, when combined and arranged and operated in the manner and for the purpose set forth.

WILLIAM W. SKINNER.

Witnesses:
   JAS. T. HOGANE,
   FRANC H. IMPEY.